United States Patent [19]
Coblentz

[11] Patent Number: 5,980,198
[45] Date of Patent: Nov. 9, 1999

[54] METHOD FOR HANDLING, TRANSPORTING AND LOADING CARTONS OF FROZEN ANIMAL PRODUCTS ONTO VESSELS

[75] Inventor: W. Sam Coblentz, Germantown, Tenn.

[73] Assignee: Stevedoring Services of America, Inc., Seattle, Wash.

[21] Appl. No.: 09/093,461

[22] Filed: Jun. 8, 1998

[51] Int. Cl.⁶ .................................................. B65G 67/00
[52] U.S. Cl. .................. 414/803; 414/142.8; 414/143.2; 414/141.7; 108/52.1; 212/270
[58] Field of Search ................................ 414/803, 142.7, 414/142.8, 143.2, 141.6, 141.7; 212/309, 310, 251, 259, 270; 108/52.1

[56] References Cited

U.S. PATENT DOCUMENTS

| | | | |
|---|---|---|---|
| 2,509,023 | 5/1950 | Vogel et al. | 214/65.2 |
| 2,671,571 | 3/1954 | Gerhardt | 214/653 |
| 2,782,066 | 2/1957 | Lord | 294/99 |
| 2,890,807 | 6/1959 | Parcell | 214/653 |
| 3,370,880 | 2/1968 | Carliss et al. | 294/87 |
| 3,433,376 | 3/1969 | Jordon | 214/653 |
| 3,971,584 | 7/1976 | Duncan | 294/88 |
| 4,185,944 | 1/1980 | Seaberg | 414/621 |
| 4,279,564 | 7/1981 | Weinert | 414/621 |
| 4,556,359 | 12/1985 | Sinclair | 414/621 |
| 4,619,579 | 10/1986 | Frison | 414/607 |
| 4,642,020 | 2/1987 | Sinclair | 414/621 |
| 4,737,069 | 4/1988 | Coblentz | 414/786 |
| 4,752,179 | 6/1988 | Seaberg | 414/607 |
| 4,890,973 | 1/1990 | Frison et al. | 414/607 |
| 5,161,934 | 11/1992 | Richardson | 414/621 |

*Primary Examiner*—Christopher P. Ellis
*Assistant Examiner*—Douglass Hess
*Attorney, Agent, or Firm*—Dorsey & Whitney LLP

[57] ABSTRACT

A method for rapid transportation and loading of stacks of cartons aboard vessels is provided which may include the mounting of slings about the stacks of cartons, transporting the cartons to the dock by a flatbed vehicle, hoisting the stacks of cartons off the flatbed vehicle and into the hold, depositing the cargo onto a landing pad, lifting the cargo off the landing pad with a lift truck, preferably a load push type lift truck, and depositing the cargo in the hold at the appropriate location. A sling pallet and a landing pad for use with the method are also disclosed. The method provides the advantages of improving the quality of the product by, inter alia, reducing the risk of thawing or spoilage, reducing costs by eliminating labor, eliminating the need to remove pallets and debris from within the vessel, reducing the likelihood of injury to workers, saving demurrage charges and speeding the transportation to and loading of the vessel.

7 Claims, 2 Drawing Sheets

METHOD FOR HANDLING, TRANSPORTING AND LOADING CARTONS OF FROZEN ANIMAL PRODUCTS ONTO VESSELS

The present invention relates to the field of cargo handling, and in particular, to the rapid transportation and loading of cartons of frozen animal products onto a refrigerated vessel.

BACKGROUND INFORMATION

While there have been significant advances in the methods employed for the loading and unloading of vessels, the loading of refrigerated, cartonized cargo, and in particular, frozen animal products has proved particularly difficult due to several intractable problems. As a result, the transfer of the products from the packers to their loading aboard a vessel is presently carried out by processes that involve high costs and significant expenditure of manual labor, and which include bottlenecks that slow the process, that may result in product degradation or spoilage, and that result in long loading times for the product onto the vessel. It is presently common for the handling of cartons of frozen animal products to proceed as follows.

A large volume of animal products such as frozen chicken, turkey, beef, pork and seafood products (including livers, hearts, parts, deboned meat and the like) are frozen and shipped in and from the U.S. in relatively flat boxes. For example, chicken thighs, legs or quarters may be shipped in cartons of about 23.5 inches in length by 16.5 inches in width by 4 to 6.25 inches in height (59.7 cm by 41.9 cm by 10.2 to 15.9 cm). A preferred standardized box size for use with this invention, however, would be 24 inches by 16 inches (61.0 cm by 40.6 cm) with the height of the box varied to hold the particular products to be shipped. A box of such chicken parts may weigh on the order of 35 to 45 pounds (16 to 20 kg).

For simplicity, reference will hereafter be made to cartons of chicken parts, as other animal products may be handled in a similar manner.

Owing to the size restrictions imposed by standard trucks and trailers, the cartons are normally stacked on 40×48 inch (102×122 cm) pallets in layers of five cartons arranged with two cartons placed on the pallet in an end-to-end relationship beside three cartons placed side to side with their long axes perpendicular to those of the first two cartons. A palletload of cartons generally contains between about 10 to 12 such layers of cartons.

The packer sends the fresh chicken parts in such palletloads to a blast freezer/cold storage warehouse. At the warehouse, the cartons are restacked with spacers between the layers thereof. The spacers allow the circulation of air between the layers of cartons. Once the cartons are so stacked, the palletload of cartons are transferred to a blast freezer, which forces air chilled to about −40° F. (−40° C.) between and around the cartons. When the freezing process is completed, the cartons are removed from the blast freezer and placed in a rotator. The load of cartons is then rotated 90 degrees onto its side, the spacers are removed, and the load of cartons is then rotated back to an upright position in which it rests once more on the pallet. In order to facilitate transportation and storage of the stacks of cartons, the stack may be wrapped with a stretchable plastic film to help prevent excessive sliding of the layers of cartons relative to one another. Lift trucks are then used to move the cartons of frozen chicken products and transport them into the cold storage warehouse.

When the time comes to load a ship, lift trucks are used to remove the palletloads of cartons of chicken parts from the warehouse, and the cartons are placed inside dry van trucks or truck trailers for transportation to the dock. These are typically uninsulated and unrefrigerated, and thus can be deleterious to the frozen product contained therein. At the dock, the cartons are removed from the truck trailer and placed on the dock, where they are subsequently lifted into the hold using the ship's gear, such as by using slings, lifting platforms or flying forks to lift the cartons and pallets.

In the hold, lift trucks engage the pallets and transport the pallets with their stacks of cartons to locations near where the cartons will be stowed. Stevedores then manually remove the cartons from the pallets and stack them without pallets for shipping. The pallets are then returned to the square of the hatch and are stacked to be hoisted out of the hold and back onto the dock by the ship's gear. The square of the hatch is the volume of space extending vertically downward from the open hatch to the floor of the cargo hold.

This process is quite inefficient. Delays in bringing a sufficient quantity of product to the dock and in unloading the cartons from the truck can increase the time needed to load the vessel. The space constrictions in the vessel limit the number of workers who can be engaged in stowing of the cartons, and thus may create a backup for product arriving at the dock. Excessive delays in loading which result in the cartons being left on the dock or in the truck can allow the product to begin to thaw, which can result in spoilage or otherwise render the product unmarketable. Delay in loading may also result in increased condensation of moisture on the cartons which can complicate the handling process. As the industry is seeking to use less wax on the cartons and to utilize paper-coated boxes, the damaging effect of condensation and internal thawing on the boxes is increased.

The breakage rate for pallets during this process is fairly high. As many as half of the pallets may suffer some breakage, and this can result in splintered wood, which may contain protruding nails, being left at the warehouse, on the dock or in the cargo hold of the vessel. Additional work is thus required to collect the pallets and pallet debris, to extract it from the hold of the ship or remove it from the dock, and to repair or discard the broken pallets. Further, the existence of pallet debris at the warehouse, on the dock, and in particular in the hold of the vessel, presents a risk of injury to workers.

Inefficient as this method of handling may be, there are a number of constraints that have made it difficult to improve. The main problems encountered is that the holds of the ship are irregular both in the overhead clearance and in the shape of the floor space. Not only does the overhead clearance of the cargo holds vary from ship to ship, and perhaps within a ship from hold to hold, the internal structure of the vessel and of the cooling system within it can result in overhead clearances that vary depending on the location within the hold.

Another difficulty in loading such cargoes is that the cartons are typically stacked to a uniform height after freezing. This is necessary for efficient use of the cold storage warehouse. This uniform height is generally ten or twelve layers of boxes arranged on a lift truck pallet, but it may vary somewhat from this number depending on the size of the cartons. The cartons are unitized by wrapping them with a stretchable plastic film that aids in transportation of the palletloads by fork lift, etc. However, space on refrigerated vessels is at such a premium that the wasted space of such pallets is considered undesirable. Thus, it has been considered necessary to avoid stowing the cartons on the pallets, and thus it has been the practice to stow the cartons in the ship by restacking them without the pallets within the ship. Moreover, since the ceiling height of holds on ships varies, and is seldom equal to the height of the cartons when stacked for warehousing purposes, it has heretofore been considered essential to manually stack the cartons in order to obtain as complete a filling of the vessel as possible.

SUMMARY OF THE INVENTION

The present invention provides a method for transportation of cartons of frozen products from the blast freezer/cold storage warehouse into a refrigerated vessel. The method may be practiced as follows.

As mentioned above, in preparing cartons of animal products and the like for freezing, the cartons are restacked on a pallet with spacers between the layers of cartons. The spacers permit the flow of cold air between the layers of the pallets and thus facilitate the rapid freezing of the product. At this stage, as the cartons require restacking with the spacers, a sling pallet may be used under the stack to be frozen.

A sling pallet, namely, a pallet with two or more channels in its upper surface, each of which extends from a first side of the pallet to the opposite side may be used in the present method. Preferably, the channels are parallel to one another and are symmetrically disposed with respect to the upper surface of the pallet. Changing to sling pallets at this stage permits the ordinary pallets to be stacked and returned to the producer.

Although it is the general practice to use pallets having dimensions of 40×48 inches (102×122 cm) in the frozen chicken parts industry to allow loading thereof into enclosed vans or trailers, the method of the present invention permits the use of 48×48 inch pallets (122×122 cm), which hold six rather than five cartons per layer. If such a layout is to be used, of course, and if restacking of the cartons is performed to accomplish this transformation, the cartons could be restacked on a sling pallet at that time. On the smaller pallet, the first layer of boxes is arranged with two cartons adjacent one side of the pallet in end to end alignment. Three cartons in a side-by-side arrangement are placed adjacent the other edge of the pallet. The cartons should be stacked on the pallet such that the channels in the pallet extend longitudinally under the two end-to-end cartons and transversely under the three side-by-side cartons. For the larger pallets, where the cartons are arranged in two rows of three side-by-side cartons, one channel should run under each such row transversely to the long axes of the cartons. The next higher layer would have the same pattern, but would be rotated ninety degrees, and the layer on top of that would be identical in layout and orientation to the first layer. This is the preferred configuration.

After the cartons are stacked with spacers between layers, the contents of the cartons are frozen in the blast freezer. The pallet and stacks of cartons are then placed in a rotater to facilitate removal of the spacers. It is also possible to replace a standard pallet with a sling pallet at this stage, rather than stacking the cartons with the spacers on the sling pallet as discussed above, although the configuration of the boxes cannot be changed from five boxes per layer to six boxes per layer at this stage without restacking.

After removal of the spacers and re-rotation of the palletload of cartons, the cartons may be wrapped with stretchable plastic film and slings may be inserted about the stack of cartons. The cartons may then be transported for storage in the refrigerated warehouse by means of lift trucks or other transportation means.

When the time for loading of a vessel comes, the palletloads of cartons are removed from the cold storage warehouse and loaded onto a truck for transportation to the dock. Preferably, the slings are placed on the stacks of cartons before they are loaded onto the truck, although the slings could be installed at the dock. Rather than loading them into uninsulated, enclosed trucks or trailers for transportation to the docks, as in the prior art method, the palletloads of cartons are loaded onto flatbed trucks or the flatbed trailer of a tractor-trailer truck and an insulating blanket of any known type which is adequate to protect the cartons against excessive warming is placed over them to reduce warming and possible melting that could occur in the uninsulated trucks. Hold-down straps may then be fastened over the stacks of cartons and blanket and tightened using the known belt and winch systems. Alternatively, if the blanket is of a sufficiently strong material or construction, the blanket itself could be used as a hold-down for the stacks of cartons and the blanket could be fastened down tightly atop the cartons. This might be accomplished, for example, by affixing straps of webbing in positions corresponding to winches on the trailers which extend beyond the edge of the blanket and pulling these tight with winches.

The trucks are then driven to the dock and positioned alongside the ship, where the ship's gear is used to lift the preslung stacks of cartons by their slings off of the truck and load them directly into the cargo hold. Since the cartons are lifted by the slings, the pallets remain on the truck and can then be transported directly back to the blast freezer/cold storage warehouse for further use. This direct loading of the ship from the flatbed truck eliminates the need for loading the cartons off the truck and onto the dock. This is important, as it reduces the amount of time the cartons are exposed directly to the ambient air and humidity, reducing the likelihood of thawing and of accumulation of condensation. Furthermore, the elimination of the need to unload trucks out onto a dock and thereafter load them into the ship eliminates delays in feeding the cargo into the ship. This is also important to the practice of the present invention since the improved efficiency in stowage provided by the present invention can only be fully utilized if the cargo can be loaded on board with sufficient speed to keep pace with the increased speed of the stowing operation.

The ship's gear deposits the cartons in the hold onto a special landing pad. This is a sling/lift truck pallet that can receive the cartons but which has channels to receive the slings so that the slings may be removed from the stacks of cartons. The landing pad also permits the stacks of cartons to be picked up directly by a load push lift truck owing to the existence of open-top channels into which the blades (or platens) of the lift truck may be inserted.

A load push lift truck, has at least two and preferably three blades extending from its lift mechanism. Preferably, the three blades are relatively broad, and have smooth, polished upper surfaces to facilitate the sliding of the cartons thereon. A push plate associated with the lift mechanism which can be extended by means of hydraulic cylinders from a retracted position adjacent the lift mechanism to a position adjacent the ends of the blades is used to extract the blades from under the cargo. Preferably, such a lift truck includes a side-shift mechanism which permits small lateral adjustments in the position of the cargo to facilitate its precise placement. Such load-push lift trucks are known in the art of specialized lift trucks.

When a cargo is landed on the landing pad, the slings may be removed from the stack of cartons. The load push lift truck positions the push mechanism in its fully retracted position and slides its blades between the blocks of the landing pad. Thereafter, the entire stack of cartons is transported to its stowage location. If the stack is to be positioned on the floor of the cargo hold, the operator maneuvers the load into position, possibly using the side shift mechanism to position it against an adjacent stack or wall, and activates the load push mechanism while backing the lift truck away from the location or allowing the load push mechanism to push it away from the stack of cartons. Additional layers of cartons can then be manually stacked on top of the cartons to fill the hold from floor to ceiling from stacks of cartons transported to a nearby location by the load push lift truck.

Alternatively, in order to reduce the amount of lifting required by the stevedores, the lift truck may first position stacks of cartons in areas to be filled. The stevedores then commence manual stacking of layers of cartons on the floor of the vessel by removing some of the layers of cartons from the stacks deposited by the load push lift truck. Once the desired number of layers have been laid down such that a full stack of cartons will fill the remainder of available space to the ceiling, the load push lift truck can then deposit full height stacks of cartons on top of such partial stacks to complete the stowing process at that location.

When the loading of the hold is completed except for the area under the square of the hatch, the load push lift truck, removed slings, if any, and landing pad may be removed from the hold. Thereafter, the square of the hatch may be filled by landing stacks of cartons therein using the ship's gear. In the absence of a landing pad, the slings may not be easily removable from the stacks of cartons so landed. As such, in order to speed the loading of the square of the hatch, the slings may be left in place. Some manual restacking of cartons to fill the square of the hatch may of course be necessary in order to avoid the wasting of space in the cargo hold.

DETAILED DESCRIPTION OF THE PREFERRED EMBODIMENTS

Figure 1:
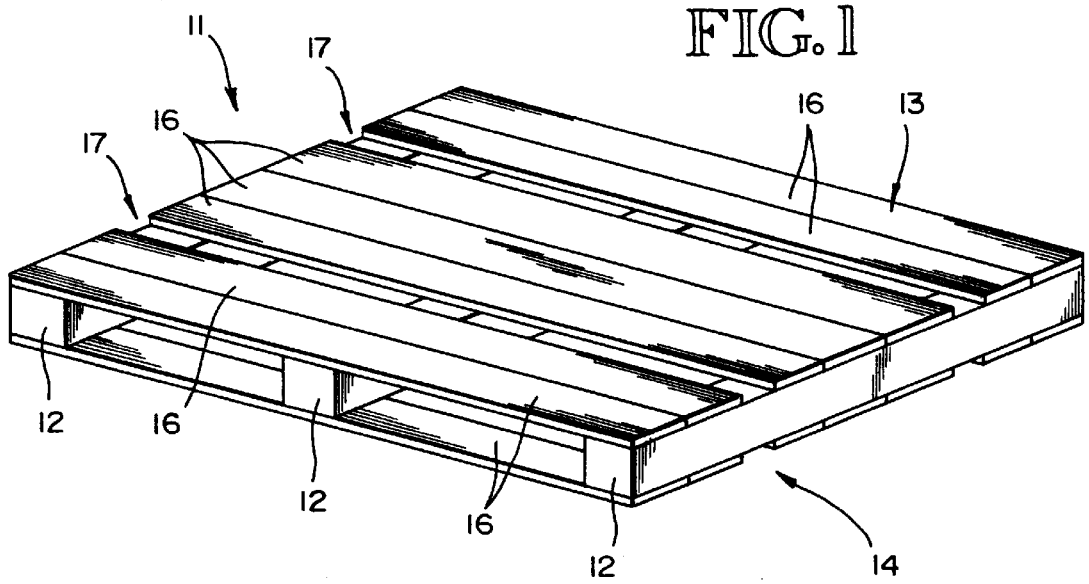
FIG. 1 is a perspective view of a wooden sling pallet according to the present invention.

FIG. 1 depicts a wooden sling pallet 11 made in a manner similar to ordinary wooden lift truck pallets. The sling pallet 11 is made by arranging three pieces of nominal 4 by 4 inch (nominal 10.2 by 10.2 cm) lumber 12 arranged in parallel with two such pieces of lumber 12 positioned adjacent the periphery of the pallet 11 and one piece 12 extending along its center line. The upper and lower surfaces 13, 14 of the pallet are formed of comparatively flat boards 16 extending transversely to the three pieces of lumber 12. These boards 16 may be, for example, a nominal one inch (2.54 cm) in thickness, and may be affixed by nails, screws, or other means to the upper and lower sides of the three pieces of lumber 12. Open-top channels 17 are formed in at least the upper surface of the pallet by adjusting the spacing between the boards 16. The channels 17 should be of a width greater than that of the slings to be used, and the depth of the channels 17 should likewise be greater than the thickness of the slings such that the slings (including the eye portion) may be inserted therethrough when a stack of cartons is loaded onto the pallet 11. Of course, sling pallets may be made of any of a variety of materials, such as plastics, metals and fiberglass, and the manufacture of pallets using such materials is known in the art of pallet manufacturing. Likewise, molding, stamping, welding, bonding, forming or other known methods may be used to make the sling pallet. The material and method used to make the pallet, however, is of less importance than the provision of channels therein which can receive slings.

In use, slings 31 may be prepositioned in the channels 17 prior to loading a stack of cartons thereon, or may be drawn through the channels after loading of the pallet by means of a rod with a hooked end or the like. Of course, it is also possible to use a standard pallet, to preposition slings on the pallet, and thereafter load the pallet with the cartons. However, the channels provide a convenient means for positioning the slings and provide the ability to add the slings either before or after loading of the pallet.

Figure 2:
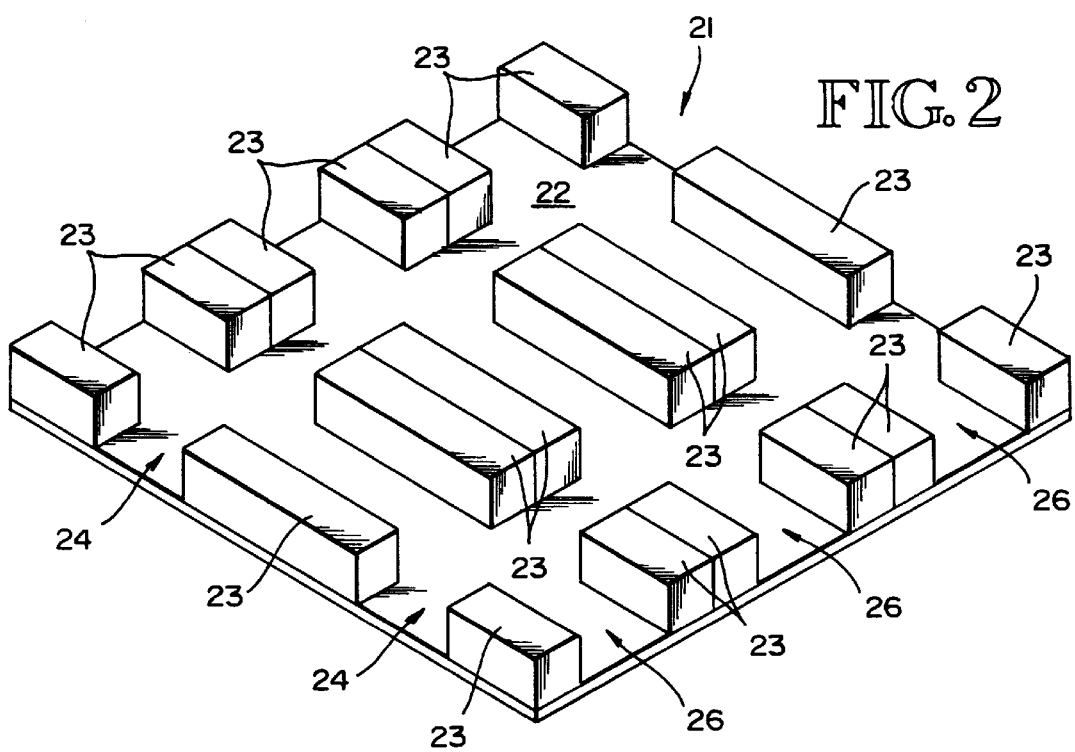
FIG. 2 is a perspective view of a wooden landing pad according to the present invention.
Figure 3:
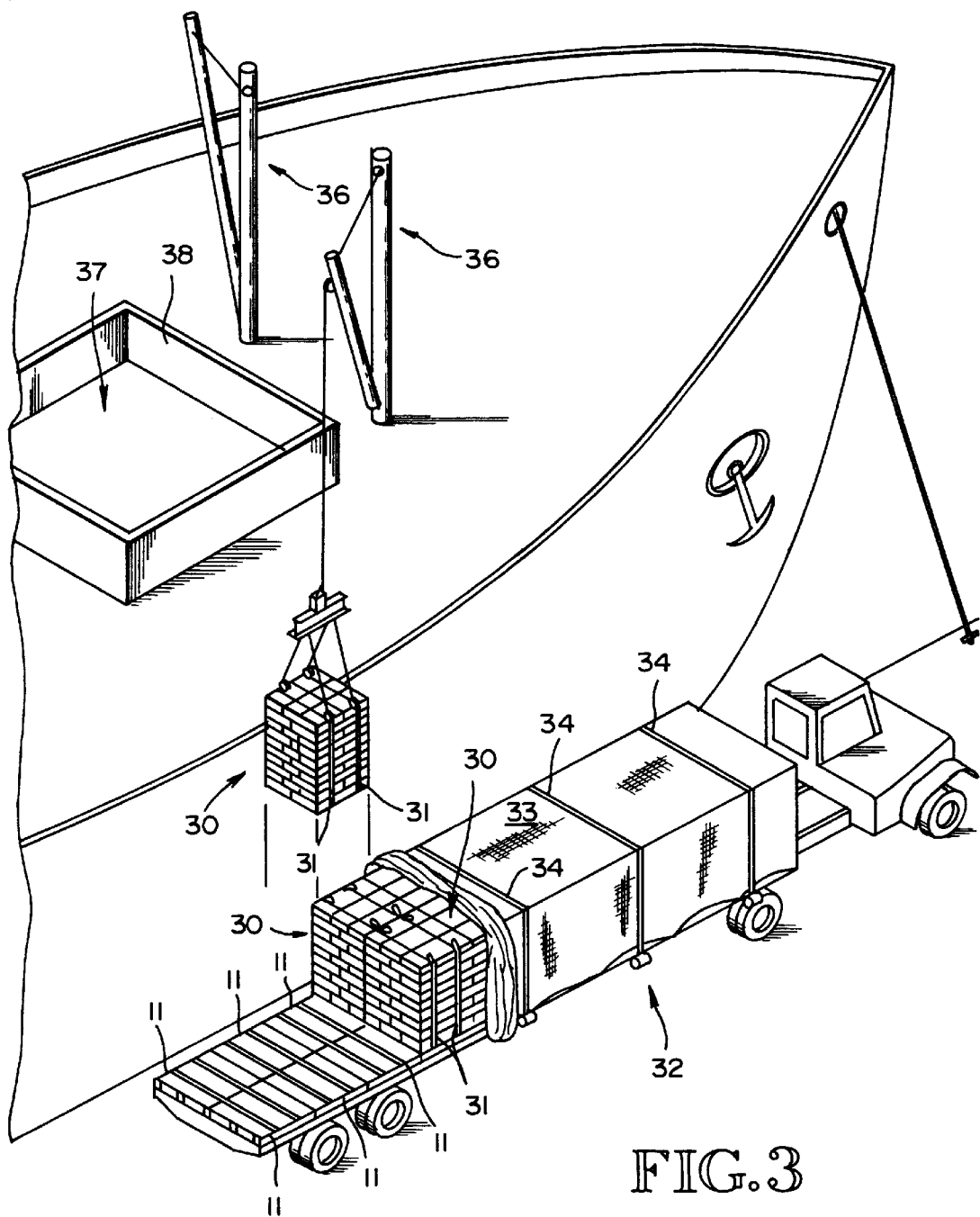
FIG. 3 is a perspective view of a flatbed tractor-trailer carrying a plurality of stacks of cartons being unloaded into a vessel.

FIG. 2 depicts a wooden landing pad 21 according to the present invention. The landing pad 21 is formed from a bottom sheet 22 of plywood. Blocks of nominal 4 by 4 inch (nominal 10.2 by 10.2 cm) lumber 23 are affixed to the bottom sheet 22 by means of nails, screws, adhesive or other means in a pattern which provides two channels 24 which extend from one edge of the bottom sheet 22 to an opposite edge thereof between the blocks 23. As with the channels 17 of the sling pallet 11, these channels 24 should be of sufficient width and depth to allow a sling 31 to be drawn therethrough.

As the preferred load push lift truck of the present invention has three blades, a second set of channels 26 is provided to receive the blades of the lift truck. These channels 26 extend transversely between the blocks 23, and are of a depth sufficient to receive the blades of the load push lift truck. As with the sling pallet 11, the landing pad 21 may be made of materials other than wood, and by methods other than the use of nails, screws and the like. The important consideration in making a suitable landing pad is the provision of the channels as discussed above.

Load push, side shift lift trucks are known in the art of specialty lift trucks. Such lift trucks are discussed, for example, in U.S. Pat. No. 4,752,179 to Seaberg discusses such a lift truck. A preferred lift truck according to the present invention would include three relatively flat blades (platens) which may conveniently have a width of 4 to 8 inches (10.2 to 20.3 cm), and would include side shift capability. The blades would be smooth and preferably polished, and would have rounded edges. The load push system should be sufficiently powerful to push a full stack of cartons of frozen chicken parts or the like off of the blades and onto another stack of cartons.

One preferred embodiment of the present method involves the transportation and stowage of the cartons of frozen products in the following manner. The preferred embodiment will be described with reference to cartons of frozen chicken parts. However, it is applicable to other frozen animal products stored in similar cartons.

A standard lift truck is used to remove stacks of cartons 30 of frozen chicken parts stacked on sling pallets 11 from the cold storage warehouse. If slings 31 have not already been provided, hooked rods are used to draw the slings 31 through the channels 17 in the pallets 11. The palletloads of cartons are then placed on a flatbed truck trailer 32. Once the trailer 32 is fully loaded, an insulating blanket 33 is used to cover the cartons 30 and is held in place by straps 34 which overlie the blanket 33 and are fastened to the frame of the trailer 32. Any of a variety of insulating blankets may be used. An R-2 insulating quilted blanket made of two sheets of a quilted water-resistant nylon with 10 ounce polyester insulation therebetween should be sufficient for most applications. Preferably, the nylon outer layers are of a light color to reflect sunlight. Blankets of this type are offered by RefrigiWear, Inc. of Dahlonega, Ga. under the WEATHER-GUARD mark, for example. Once the blanket 33 and cartons 30 have been secured in place, the tractor-trailer 32 is then driven to the dock.

At the dock, once the vessel is ready to receive the stacks of cartons 30 from the trailer 32, the straps 34 and insulating blanket 33 are removed, and the ship's gear 36 (or a shore crane) is used to lift the stacks off the sling pallets and into the hold. Preferably, the blanket 33 is rolled up as the stacks of cartons 30 are lifted from the trailer by the ship's gear 36. The insulating blanket 33 is then returned to the warehouse for use on the next load.

The ship's gear 36 deposits the stack of cartons in the ship's hold 37 on a landing pad 21 situated in the square of the hold. The square of the hold is the volume space extending vertically downward from the open hatch 38. Once the stack of cartons 30 has been deposited on the landing pad, the slings 31 are released from the ship's gear 36 and are drawn through the channels 24 in the landing pad 21 to remove them from the stack of cartons.

A load push lift truck is then used to lift the stack of cartons off the landing pad 21 and to transport the cartons to the storage location. At this stage, either of two approaches may be taken. The load push lift truck may initially deposit the cartons 30 in their final stowage locations, with a view to stevedores subsequently filling the remaining space atop the stack from a lift-truck-deposited stack nearby, or the lift truck may deposit the stack in a convenient location with a view to the stevedores breaking down the stack into two or more shorter stacks on top of which the load push lift truck may deposit a full stack of cartons 30, the combined height of the hand-stacked and lift-truck-deposited cartons filling the available vertical space.

In order to deposit a stack of cartons 30 on the floor of the cargo hold, the lift truck operator moves the stack into the desired position and lowers the blades of the lift truck to the floor. If necessary, the side shift can be used to position the stack in abutting relation with an adjacent stack or wall. The lift truck operator then simultaneously actuates the load push mechanism and either backs the lift truck away from the location or allows the load push mechanism to push the lift truck back from the stack (assuming the front of the stack is engaged with another stack or with a wall). The process for depositing a stack of cartons 30 on top of another partial or full stack is the same, except the lift truck positions the blades immediately above the full or partial stack on top of which the full stack is to be deposited.

For stowage in irregular spaces, such as adjacent a sloping wall, in spaces too small for a full stack to be inserted or the like, the lift truck may deposit a full stack of cartons near such stowage location and the stevedores can stow the cartons in such areas by hand.

When substantially all of the cargo hold has been filled, apart from the square of the hatch 38, the lift truck and landing pad 21 are removed from the hold, and the square of the hatch is filled by depositing stacks of cartons directly into the square of the hatch using the ship's gear. Some manual stowage of cartons will likely be necessary, of course, as the ceiling height under the closed hatch may not be fillable merely by loading full stacks of cartons one on top of another.

Of course, in the absence of the landing pad 21, most of the slings used to load the stacks of cartons into the square of the hatch may have to be left in the cargo hold. However, this will facilitate the offloading of the vessel, and the cost of the cargo slings is offset by the lower labor and other costs achieved by the practice.

It is important that the elements of the aforementioned method be used together for maximum efficiency. At present, using the prior art method of transportation and stowage, there are several critical bottlenecks that prevent the efficient handling of the cargo. The current manual method of stowage is capable of stowing not more than about 20 to 40 metric tons per hour per hatch. At this pace, the unloading process for the trucks, the extracting pallets from the cargo hold and handling thereof and other ship-side activities become extremely hectic. As the present method would permit an increase in the stowage rate to about 70 to 110 metric tons per hour per hatch, the prior art method of using enclosed trucks, unloading the trucks onto the dock, transporting the cartons into the hold together with pallets and the like would not be able to keep pace with the stevedores in the hold, even though the number of stevedores required for the practice of the present method is substantially less than required for the prior art method.

Similarly, the use of the present method speeds loading of the cartons onto the trucks and placing thereof under the ship's gear, so that the transportation of the stacks of cartons from the warehouse to the dock can keep pace with the loading.

While the present invention has been described with reference to the preferred embodiments, it will be apparent to those skilled in the art that modifications to the method may be made within the scope of the invention.

What is claimed is:

1. A method of transporting and stowing cartons of frozen animal products wherein said cartons are initially arranged in stacks, the method comprising:

providing at least two cargo slings extending around said stack of cartons;

loading a stack of cartons of said frozen animal products aboard a flat bed vehicle;

covering said stack of cartons with an insulating blanket;

transporting said stack to a location adjacent a vessel to be loaded, said vessel having at least one hold, by means of said flat bed vehicle;

providing a load-push lift truck within said hold, said load-push lift truck comprising a truck body and at least two generally horizontally extending blades, said blades being mounted to said lift truck such that they are capable of being raised and lowered with respect to the truck body;

providing a landing pad within the hold of said vessel, said landing pad having two transversely extending channels in the upper surface thereof adapted to receive the cargo slings, and having dimensions sufficient to allow cargo slings to be drawn therethrough, said landing pad further including a plurality of channels formed in its upper surface of size and arrangement sufficient to receive the blades of a load push lift truck;

lifting said stack onto said vessel by said slings and landing said stack on said landing pad such that the slings are in alignment with the channels in the landing pad;

lifting said cartons off the landing pad using a load push lift truck having a load push mechanism associated with a plurality of cargo supporting and lifting blades by inserting the blades of said lift truck into said plurality of channels and raising said blades;

transporting said cartons to a stowage location; and depositing said cartons at the stowage location by said load push mechanism.

2. The method of claim 1 wherein said step of providing at least two cargo slings extending around said stack of cartons comprises supporting said stack on a sling pallet having a plurality of channels in its upper surface and inserting slings through said channels.

3. The method of claim 1 wherein said stack of cartons is covered with an insulating blanket prior to being transported to said location adjacent the vessel.

4. A method of transporting and stowing stacks of cartons of frozen animal products in a vessel having a cargo hold therein, wherein said cartons are initially arranged in stacks the method comprising:

providing at least two and not more than three slings arranged about said stack of frozen animal products, said stack of frozen animal products consisting of a plurality of layers of cartons of frozen animal products, the bottom layer of which includes at least five cartons of frozen animal products;

positioning said stack of cartons adjacent a vessel to be loaded;

lifting said stack by said slings into the cargo hold of said vessel and depositing said stack of cartons in said cargo hold;

lifting said stack by a lift truck without use of a pallet; and depositing said stack of cartons in a final stowage location by said lift truck.

5. A method of transporting and stowing stacks of cartons of frozen animal products in a vessel having a cargo hold therein, wherein said cartons are initially arranged in stacks, said method comprising:

covering said stack of frozen animal products with an insulating blanket prior to transporting said stack of frozen animal products to a position adjacent a vessel to be loaded;

providing at least two slings arranged about said stack of frozen animal products;

transporting said stack of frozen animal products to a position adjacent a vessel to be loaded by a flat bed vehicle and removing the insulating blanket subsequent to said transporting to said position adjacent said vessel;

providing a landing pad in the cargo hold of said vessel, the upper surface of said landing pad being adapted to receive said at least two slings;

lifting said stack by said slings into the cargo hold of said vessel and depositing said stack of cartons in said cargo hold onto said landing pad;

lifting said stack by means of a lift truck without use of a pallet; and depositing said stack of cartons in a final storage location by means of said lift truck.

6. The method of claim 5 wherein said stack of cartons is supported by a sling pallet before being loaded onto said flat bed vehicle, said sling pallet having a plurality of channels extending beneath said stack of cartons from one side thereof to the opposite side thereof, and wherein said at least two slings are inserted through said channels.

7. The method of claim 6 further comprising the step of filling the square of the hatch wherein stacks of cartons are lifted by said slings and deposited with said slings at their final stowage locations.

\* \* \* \* \*